Aug. 14, 1951     L. J. HAWORTH ET AL     2,564,006
PRECISION ANGLE MARKER
Filed Nov. 17, 1944     2 Sheets-Sheet 1
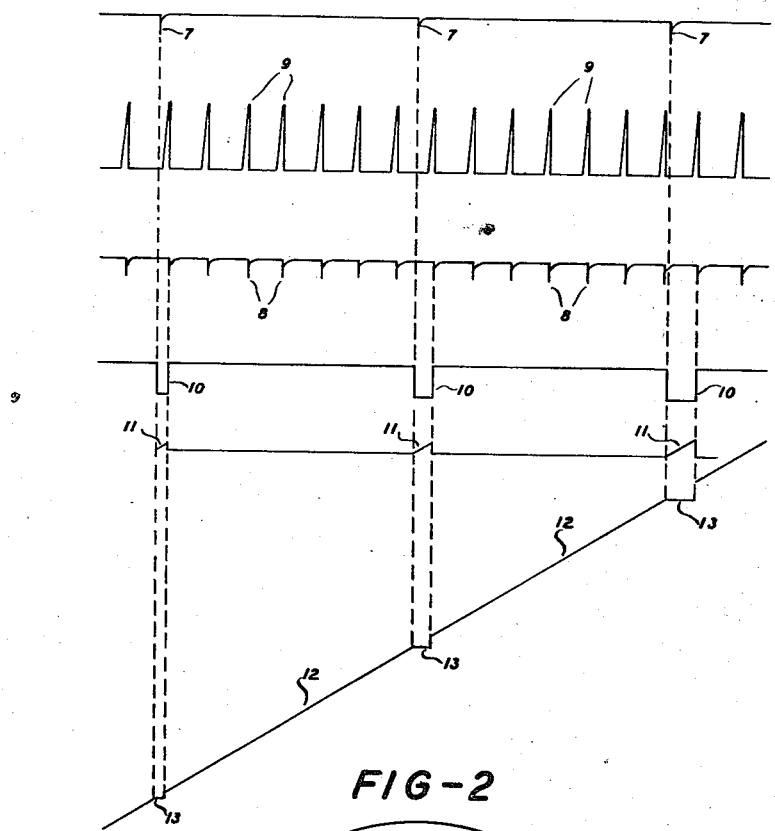
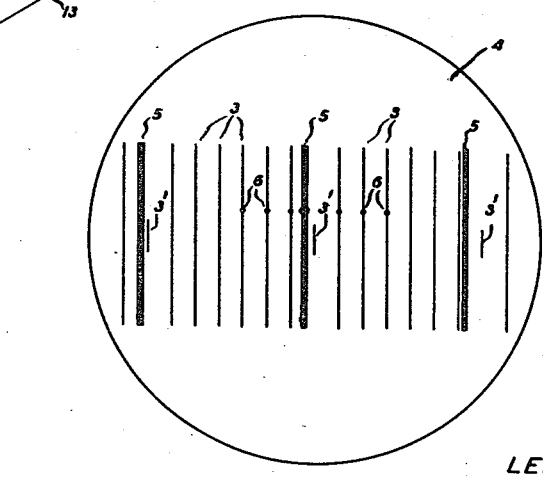
INVENTORS
LELAND J. HAWORTH
CHALMERS W. SHERWIN
BY
William D. Hall.
Attorney

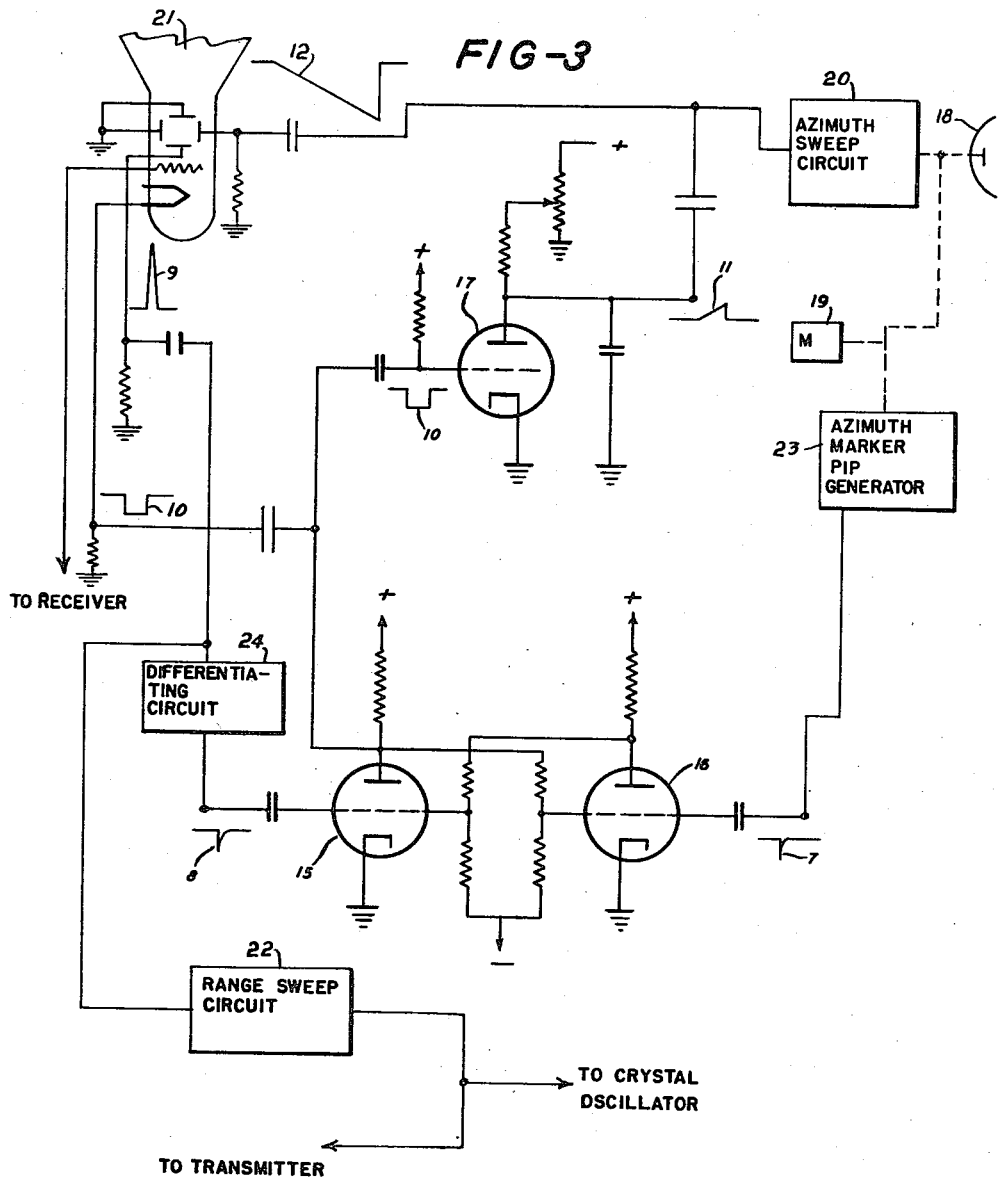

Patented Aug. 14, 1951

2,564,006

UNITED STATES PATENT OFFICE 2,564,006

PRECISION ANGLE MARKER

Leland J. Haworth and Chalmers W. Sherwin, Belmont, Mass., assignors, by mesne assignments, to the United States of America as represented by the Secretary of War Application November 17, 1944, Serial No. 563,967

2 Claims. (Cl. 343—10)

This invention relates to a system for improving the accuracy of gun-laying radio object-locating equipment or the like, and particularly to a system of forming precision angle markers for B-scan presentation in such equipment.

In the B-scan type of signal presentation, the position of a specified target relative to a gun or other instrumentality is indicated on a cathode ray tube viewing screen with reference to the coordinates of azimuth and range, azimuth usually being represented as abscissa and range as ordinate. "Azimuth," as used herein, should be understood to mean horizontal angular displacement of the target relative to the direction of aim or other reference axis.

In order to afford an azimuth scale which will be accurate for all ranges within the operative limits of the system, it is desirable to provide what are known as angle markers on the screen where the target image is being viewed. Such angle markers comprise selected vertical range-sweep lines which are intensified for the purpose of indicating certain azimuth reference values, for example, —1°, 0° and +1°. These markers are utilized for quantitative determination as to the angular displacement of the target relative to the reference axis.

The range-sweep lines which are to serve as angle markers are selected at predetermined points in the horizontal sweep of the B-scan as controlled by timed electrical impulses or pips, each pip being generated at the instant when the radiation beam attains a predetermined reference position in azimuth. Heretofore there has been no assurance that a synchronized correlation will exist between the angle marker pips and the range-sweep lines, this being particularly true of high-speed scanning equipment in which there is a probability that no range-sweep line will coincide with a particular angle marker pip for several azimuth sweeps. This has caused an undesirable intermittency of the angle markers which tends, in some measure, to detract from the accuracy of aim.

In view of the foregoing, it is an object of this invention to achieve, in effect, coincidence between each angle marker pip and a range-sweep line in substantially every azimuth sweep, thereby to afford steady angle marker indications on the viewing screen.

More specifically, the invention accomplishes this objective by causing momentary interruption, if necessary, in the azimuth sweep each time an angle marker pip is generated, until at least the first succeeding range-sweep line is traced out on the screen, and in the meantime producing an intensifier gate or pulse which is triggered on by the angle marker pip and triggered off by the succeeding range-sweep pulse. The intensifier gate serves to brighten the aforesaid range-sweep line so that it may be utilized as a precision angle marker. Any slight discrepancy which may exist between the indicated azimuth position and the actual position of the radiation beam, due to the very brief interruption of the azimuth sweep, is compensated when the azimuth sweep is resumed at the termination of the intensifier gate.

Other novel features and disadvantages of the present invention will appear from the following disclosure.

In the drawings:

Fig. 1 comprises a series of voltage-time diagrams illustrating various operative relationships embodied in our novel system;

Fig. 2 is a simplified elevational view of a cathode ray tube screen showing B-scan presentation and several typical angle markers and target representations; and Fig. 3 is a wiring diagram of certain circuits which perform the above-described functions.

Referring to the B-scan presentation illustrated in Fig. 2 (in which the spacing of the sweep lines is exaggerated for clarity), the substantially vertical range-sweep lines 3 traced upon the cathode ray tube screen 4 occur at intervals of about .06° apart in azimuth and are ordinarily of very low intensity or invisible to the eye. It is desirable that one or more of the lines 3 be intensified as indicated at 5 to serve as precision angle markers for locating the reference angles. In the present case it will be assumed that there are three angle markers 5, respectively corresponding to azimuth angles of —1°, 0° and +1°.

The target echoes appear as bright spots such as 6, which are positioned on the vertical range-sweep lines 3 in accordance with the range of the target. A large target such as a vessel will produce several aligned spots 6 on adjacent sweep lines 3. In tracking the target the operator usually positions the axis of the gun or other instrumentality so that the end spots are spaced substantially equal distances from the central marker. When tracking of the target is properly performed, the echo image from the selected target appears to remain stationary on the screen, while images of other objects moving with reference to the target will drift across the screen.

The various graphs in Fig. 1 are drawn to the same horizontal time scale. The angle marker pips 7 are preferably about .03° wide and each pip is generated when the scanning beam attains a predetermined position in azimuth. In the present instance the pips occur at azimuth angles of −1°, 0° and +1°. Electronic marking is advantageous in that it affords an automatically self-adjusting feature which might not be available if a fixed azimuth scale were provided on the screen. Any suitable means may be employed to form the pips 7; for example, a slotted disc geared to the rotary drive of the antenna may be so arranged in relation to a photocell and light source that marker pips are generated at the selected values of azimuth.

Trigger pulses 8 are generated at the terminations of the various range sweeps 9 which are derived from a crystal oscillator. The relative timing of pips 7 and pulses 8 is not necessarily the same as shown in Fig. 1, but may change in each azimuth sweep inasmuch as the respective means for producing these electrical effects operate independently of each other. The pips 7 are utilized to trigger a flip-flop circuit, such as the one illustrated in Fig. 3, thereby to produce rectangular pulses 10 which are terminated by the next succeeding range-sweep pulse 8. The pulses 10 will be referred to hereinafter as intensifier gates. It should be noted that if an exact coincidence exists between a pip 7 and a pulse 8, the corresponding gate 10 is of infinitesimal width. The intensifier gates 10 are utilized to produce sawtooth voltage pulses 11, the slopes of which are of substantially the same magnitude as the slope of the angle-sweep voltage (azimuth sweep) represented graphically at 12. The sawtooth voltage is subtracted from the angle-sweep voltage to render the angle-sweep voltage constant as indicated at 13 during the intervals in which the gates 10 are applied, thereby interrupting the azimuth sweep during these intervals.

Fig. 3 shows part of a conventional B-scan radio-object-locating system to which is connected the novel precision angle marker. The conventional B-scan radio-object-locating system consists of an antenna 18 scanned in azimuth at a constant rate by motor 19. Azimuth sweep circuit 20 is synchronized with the scanning of antenna 18 and is any circuit capable of providing a sawtooth voltage varying linearly with respect to the angular position of antenna 18, such as the circuit described on page 278 of "Radar System Fundamentals," Navships 900,017, Bureau of Ships, Navy Department, dated April 1944. Azimuth sweep 12 is obtained from the output of azimuth sweep circuit 20 and applied to the horizontal-deflection electrodes of cathode ray tube 21. A crystal oscillator is used to control range sweep circuit 22 and the pulsing of the transmitter of the radio-object-locating system, so as to initiate a range sweep 9 simultaneously with the radiation of a pulse from the transmitter. Range sweep 9 is applied to the vertical-deflection electrodes of cathode ray tube 21, forming range sweep lines 3 on the screen 4 (Fig. 2) of cathode ray tube 21. Target echoes from the receiver of the radio-object-locating system are applied to the grid of cathode ray tube 21 and are effective in intensifying the electron beam thereof. The target echoes are presented on screen 4 of cathode ray tube 21 as spots 6 (Fig. 2), the abscissa of any particular spot being proportional to the azimuth of the target and the ordinate of the particular spot being proportional to the range of the target. The precision angle marker consists of an azimuth marker pip generator 23 which, as described above, may be a slotted disc synchronized with the scanning of the antenna and so arranged in relation to a photocell and light source that negative azimuth marker pips 7 are generated at selected values of azimuth. However, any other conventional switching device synchronized with the scanning of the antenna which is effective in generating pips at selected values of azimuth can be used. Pips 7 are applied to the control electrode of electron tube 16. Negative trigger pulse 8 is derived from the lagging edge of range sweep 9 by well known means, such as a differentiating circuit 24, and then applied to the grid of electron tube 16. The electron tubes 15 and 16 are arranged in a conventional flip-flop circuit in which one tube is automatically rendered conductive when the other tube is rendered non-conductive, and vice versa. Thus, a negative marker pip 7 impressed upon the grid of tube 16 cuts this tube off and enables the tube 15 to conduct. The succeeding negative range-sweep pulse 8 which is impressed upon the grid of tube 15 cuts this tube off and thereby starts the tube 16 conducting. Thereafter, the tube 15 remains non-conductive until the next marker pip 7 occurs. During the period when tube 15 conducts, the negative intensifier gate 10 is formed in the plate circuit of this tube and is applied to the cathode of cathode ray tube 21 and also to the grid of a tube 17 which is included in a sawtooth generating circuit. The sawtooth pulses 11 having a duration equal to gate 10 appear at the output of this circuit. The time constant of the output of the sawtooth generating circuit is such that sawtooth pulses 11 have a slope substantially equal to the negative of the slope of the azimuth sweep. Pulses 11 are applied to the horizontal deflecting electrodes of cathode ray tube to generate a deflecting force opposite to that of the azimuth sweep voltage 12, and thus nullify the azimuth sweep and thereby substantially stop the horizontal movement of the electron beam of cathode ray tube 21 for the duration of each pulse 11.

The range-sweep lines 3 next following each pip 7, which are traced on the screen 4, Fig. 2, become intensified to form the angle markers 5. These markers are located at positions on the screen 4 exactly corresponding to the azimuth positions of the scanning beam when the pips 7 are generated, namely at −1°, 0° and +1°. Due to interruption of the azimuth sweep as aforesaid, the markers 5 may be displaced slightly from the positions 3' which they would otherwise occupy if they were ordinary range-sweep lines 3, as indicated in Fig. 2. Following the intervals 13, Fig. 1, however, the time variation of the angle sweep voltage continues to follow its original linear function so that the positions of the range-sweep lines 3 in azimuth are undisturbed by the formation of the markers 5.

The important feature of our novel system is that it enables the intensification of a range-sweep line 3 for each pip 7, thus forming a precision angle-marker 5 in every azimuth sweep regardless of whether or not there is exact coincidence in timing of the angle marker pips and the range-sweep lines. This produces readily discernible angle marker indications without objectionable flickering.

While we have illustrated and described a selected embodiment of our invention, it will be understood that variations and modifications may be made therein, and therefore we do not desire to limit the invention to the precise details disclosed herein but wish to avail ourselves of all improvements and modifications within the purview of the following claims.

We claim:

1. In combination with a radio-object-locating system having a directive antenna, means for scanning said antenna through an angle, a cathode ray indicator, means for generating an angle sweep voltage synchronized with said scanning means, means for applying said angle sweep voltage to said cathode ray indicator for deflecting the cathode ray of said indicator along a first coordinate, means for generating a plurality of linear range sweep voltages for each angle sweep voltage, and means for applying said range sweep voltage to said cathode ray indicator for deflecting the cathode ray of said indicator along a second coordinate; an angle marker comprising means synchronized with said antenna scanning means for initiating at a given value of said angle the generation of a marker sweep voltage having a rate of change substantially equal to said angle sweep voltage, means for terminating said marker sweep voltage on the occurrence of the first range sweep voltage which follows the initiating of said marker sweep voltage, means for applying said marker sweep voltage to said cathode ray indicator for counteracting the deflection of the cathode ray along said first coordinate due to said angle sweep voltage, and means for varying the intensity of said cathode ray of said indicator during the time interval of said marker sweep voltage.

2. A combination according to claim 1, wherein said marker pulse initiating means includes a flip-flop circuit having first and second electron tubes regeneratively connected, means for producing a first trigger pulse at the time of occurrence of said given value of said angle, means for applying said first trigger pulse to the input of said first tube, a sawtooth voltage generator, and means for applying the output of said second tube to said sawtooth generator; wherein said marker pulse terminating means includes means for producing a second trigger pulse on the occurrence of the first range sweep voltage which follows the initiation of said marker sweep voltage, and means for applying said second trigger pulse to the input of said second tube, and wherein said cathode ray intensity varying means includes means for applying the output of said second tube to an intensity-control electrode of said indicator.

LELAND J. HAWORTH.
CHALMERS W. SHERWIN.

REFERENCES CITED

The following references are of record in the file of this patent:

UNITED STATES PATENTS

| Number | Name | Date |
|---|---|---|
| 2,121,359 | Luck et al. | June 21, 1938 |
| 2,265,996 | Blumlein | Dec. 16, 1941 |
| 2,363,810 | Schrader et al. | Nov. 28, 1944 |
| 2,422,182 | Bryant | June 17, 1947 |
| 2,453,711 | Isbister et al. | Nov. 16, 1948 |

FOREIGN PATENTS

| Number | Country | Date |
|---|---|---|
| 113,233 | Great Britain | June 2, 1941 |